(12) United States Patent
Miyao (10) Patent No.: US 11,422,398 B2
(45) Date of Patent: Aug. 23, 2022

(54) DISPLAY DEVICE

(71) Applicant: Japan Display Inc., Tokyo (JP)

(72) Inventor: Makoto Miyao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/120,910

(22) Filed: Dec. 14, 2020

(65) Prior Publication Data

US 2021/0096406 A1 Apr. 1, 2021

Related U.S. Application Data

(63) Continuation of application No. PCT/JP2019/020781, filed on May 24, 2019.

(30) Foreign Application Priority Data

Jun. 15, 2018 (JP) .............................. JP2018-114488

(51) Int. Cl.
| | | |
|---|---|---|
| *G02F 1/1333* | (2006.01) | |
| *G02F 1/1334* | (2006.01) | |
| *G02F 1/1339* | (2006.01) | |
| *G02F 1/1362* | (2006.01) | |
| *G02F 1/1368* | (2006.01) | |

(52) U.S. Cl.
CPC .. *G02F 1/133368* (2021.01); *G02F 1/133342* (2021.01); *G02F 1/1334* (2013.01); *G02F 1/1339* (2013.01); *G02F 1/1368* (2013.01); *G02F 1/13347* (2021.01); *G02F 1/133331* (2021.01); *G02F 1/136227* (2013.01); *G02F 1/136286* (2013.01)

(58) Field of Classification Search
CPC ............. G02F 1/133342; G02F 1/1334; G02F 1/13347; G02F 1/133615; G02F 1/133331; G02F 1/133368; G02F 1/133302
See application file for complete search history.

(56) References Cited

U.S. PATENT DOCUMENTS

| | | | |
|---|---|---|---|
| 2003/0223218 A1 | 12/2003 | Kawakami | |
| 2012/0002142 A1* | 1/2012 | Asaoka | ............. G02F 1/133512 445/24 |

(Continued)

FOREIGN PATENT DOCUMENTS

| | | |
|---|---|---|
| JP | 2003-331629 A | 11/2003 |
| JP | 2007-171459 A | 7/2007 |

(Continued)

OTHER PUBLICATIONS

International Search Report dated Jul. 16, 2019 in PCT/JP2019/020781 filed May 24, 2019, 2 pages.

(Continued)

*Primary Examiner* — Angela K Davison
(74) *Attorney, Agent, or Firm* — Maier & Maier, PLLC (57) ABSTRACT

According to one embodiment, a display device includes a first transparent substrate including a first main surface and a second main surface, a second transparent substrate including a third main surface, pixels arrayed in a matrix, a sealant surrounding the pixels without a break, a polymer dispersed liquid crystal layer sealed by the sealant, a third transparent substrate including a first end portion and bonded to the first main surface, and first light sources opposed to the first end portion.

13 Claims, 7 Drawing Sheets

(56) References Cited

U.S. PATENT DOCUMENTS

| | | | |
|---|---|---|---|
| 2013/0314620 A1* | 11/2013 | Ebisui | G02F 1/133753 |
| | | | 349/1 |
| 2014/0140654 A1 | 5/2014 | Brown et al. | |
| 2015/0022746 A1 | 1/2015 | Ichihashi et al. | |
| 2017/0363891 A1* | 12/2017 | Miyachi | G02F 1/1339 |

FOREIGN PATENT DOCUMENTS

| | | |
|---|---|---|
| JP | 2013-243089 A | 12/2013 |
| JP | 2014-132328 A | 7/2014 |
| WO | WO 2010/103589 A1 | 9/2010 |
| WO | WO 2013/179679 A1 | 12/2013 |

OTHER PUBLICATIONS

Office Action dated May 10, 2022, in Japanese Patent Application No. 2018-114488 w/English Machine Translation.

\* cited by examiner

DISPLAY DEVICE

CROSS-REFERENCE TO RELATED APPLICATIONS

This application is a Continuation Application of PCT Application No. PCT/JP2019/020781, filed May 24, 2019 and based upon and claiming the benefit of priority from Japanese Patent Application No. 2018-114488, filed Jun. 15, 2018, the entire contents of all of which are incorporated herein by reference.

FIELD

Embodiments described herein relate generally to a display device.

BACKGROUND

Recently, various types of illumination devices using polymer dispersed liquid crystal (hereinafter often referred to as "PDLC") capable of changing a diffusing state of diffusing incident light and a transmitting state of causing the incident light to be transmitted have been proposed.

For example, a display device urging image modulated light supplied from an input image element to be guided through a waveguide has been disclosed.

DETAILED DESCRIPTION

In general, according to one embodiment, there is provided a display device, comprising: a first transparent substrate including a first main surface and a second main surface located on a side opposite to the first main surface; a second transparent substrate including a third main surface opposed to the second main surface; pixels provided between the first transparent substrate and the second transparent substrate and arrayed in a matrix; a sealant located between the second main surface and the third main surface and surrounding the pixels arrayed in the matrix without a break; a polymer dispersed liquid crystal layer sealed between the second main surface and the third main surface by the sealant and containing polymer and liquid crystal molecules; a third transparent substrate including a first end portion and bonded to the first main surface; and first light sources located on the first main surface side and opposed to the first end portion.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

Figure 1:
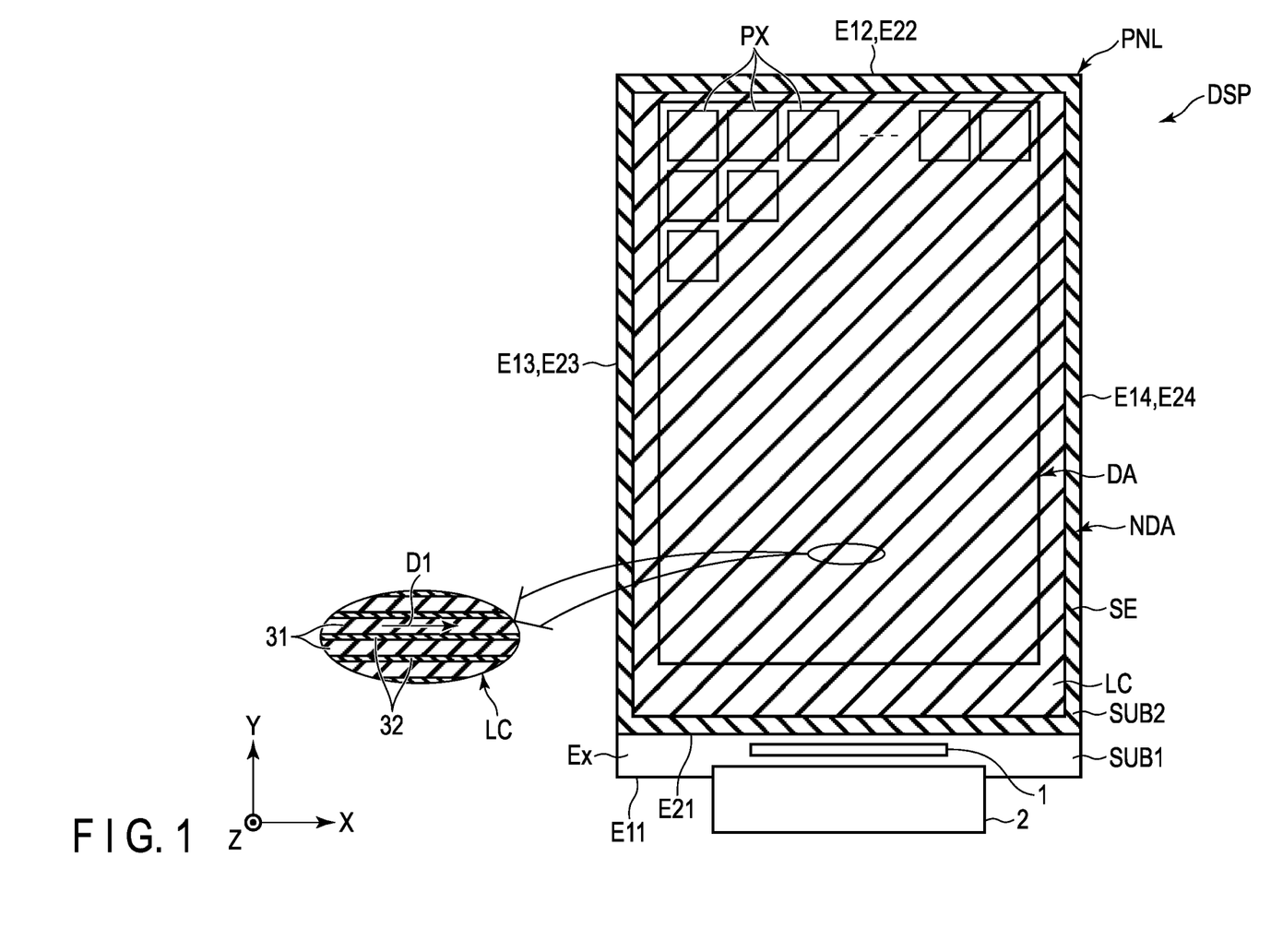
FIG. 1 is a plan view showing a configuration example of a display device DSP of an embodiments.

FIG. 1 is a plan view showing a configuration example of a display device DSP of the embodiment. For example, the first direction X, the second direction Y, and the third direction Z are orthogonal to each other but may intersect at an angle other than 90 degrees. The first direction X and the second direction Y correspond to the directions parallel to the main surface of a substrate constituting the display device DSP, and the third direction Z corresponds to the thickness direction of the display device DSP. In the present specification, a direction from the first substrate SUB1 to the second substrate SUB2 is referred to as an upward direction (or, more simply, upwardly) and a direction from the second substrate SUB2 to the first substrate SUB1 is referred to as a downward direction (or, more simply, downwardly). According to "a second member on a first member" and "a second member under a first member", the second member may be in contact with the first member or may be remote from the first member. In addition, it is assumed that an observation position at which the display device DSP is to be observed is at the pointing end side of the arrow indicating the third direction Z, and a view toward an X-Y plane defined by the first direction X and the second direction Y from this observation position is called a planar view.

In the embodiments, a liquid crystal display device employing polymer dispersed liquid crystal will be described as an example of the display device DSP. The display device DSP comprises a display panel PNL, an IC chip 1, and a wiring substrate 2.

The display panel PNL comprises a first substrate SUB1, a second substrate SUB2, a liquid crystal layer LC, and a sealant SE. The first substrate SUB1 and the second substrate SUB2 are formed in a flat plate parallel to the X-Y plane. The first substrate SUB1 and the second substrate SUB2 are overlaid in planar view. The first substrate SUB1 and the second substrate SUB2 are bonded to each other by a sealant SE. The sealant SE is formed in a loop shape by single ultraviolet curing resin and does not include a liquid crystal inlet and a sealing material. The liquid crystal layer LC is held between the first substrate SUB1 and the second substrate SUB2, and is sealed by a sealant SE. In FIG. 1, the liquid crystal layer LC and the sealant SE are represented by different oblique lines.

As enlarged in FIG. 1, the liquid crystal layer LC comprises polymer dispersed liquid crystal containing polymers 31 and liquid crystal molecules 32. For example, the polymer 31 is liquid crystal polymer. The polymer 31 extend in a stripe shape. An extending direction D1 of the polymers 31 is parallel to the first direction X. The liquid crystal molecules 32 are dispersed in gaps of the polymers 31 and aligned such that their longer axes extend in the first direction X. Each of the polymers 31 and the liquid crystal molecules 32 has optical anisotropy or refractive anisotropy.

The responsiveness of the polymer 31 to the electric field is lower than the responsiveness of the liquid crystal molecules 32 to the electric field.

For example, the orientation direction of the polymers 31 is hardly varied irrespective of the presence or absence of the electric field. In contrast, the orientation direction of the liquid crystal molecules 32 is varied in accordance with the electric field in a state in which a voltage higher than or equal to the threshold value is applied to the liquid crystal layer LC. In a state in which the voltage is not applied to the liquid crystal layer LC, optical axes of the polymers 31 and the liquid crystal molecules 32 are parallel to one another and the light made incident on the liquid crystal layer LC is transmitted without being substantially scattered in the liquid crystal layer LC (transparent state). In a state in which the voltage is applied to the liquid crystal layer LC, optical axes of the polymers 31 and the liquid crystal molecules 32 intersect one another and the light made incident on the liquid crystal layer LC is scattered in the liquid crystal layer LC (scattered state).

The display panel PNL comprises a display portion DA which displays an image and a non-display portion NDA in a frame shape surrounding the display portion DA. The display portion DA comprises pixels PX arrayed in a matrix in the first direction X and the second direction Y. The sealant SE is located at the non-display portion NDA to surround the pixels PX arrayed in a matrix without a break.

The first substrate SUB1 includes end portions E11 and E12 extending in the first direction X, and end portions E13 and E14 extending in the second direction Y. The second substrate SUB2 includes end portions E21 and E22 extending in the first direction X, and end portions E23 and E24 extending in the second direction Y. In the example illustrated in FIG. 1, the end portions E12 and E22, the end portions E13 and E23, and the end portions 514 and E24 are overlaid on each other in planar view, but may not be overlaid. The end portion E21 is located between the end portion E11 and the display portion DA in planar view. The first substrate SUB1 includes an extended portion Ex between the end portion E11 and the end portion E21.

Each of the IC chip 1 and the wiring substrate 2 is connected to the extended portion Ex. The IC chip 1 incorporates, for example, a display driver which outputs a signal necessary for image display, and the like. The display driver incorporates at least some of a signal line drive circuit SD, a scanning line drive circuit GD, and a common electrode drive circuit CD which will be described later. The wiring substrate 2 is a foldable flexible printed circuit. Incidentally, the IC chip 1 may be connected to the wiring substrate 2. The IC chip 1 and wiring substrate 2 read signals from the display panel PNL in some cases, but mainly function as signal sources which supply signals to the display panel PNL.

In the embodiments, the liquid crystal layer LC is formed by drop injection method. The drop injection method is also referred to as One Drop Fill (ODF). First, the ODF forms a sequential frame with a sealing material (ultraviolet curing resin) on one of substrates and drops the liquid crystal material into the inside of the frame. After that, the other substrate is overlaid on the substrate, and the sealing material is cured by irradiating ultraviolet rays. The liquid crystal material is a mixture of the liquid crystal monomers and liquid crystal molecules. The liquid crystal monomers are polymerized by ultraviolet irradiation to form the stripe-shaped polymers 31. According to the ODF, the injection time of the liquid crystal material can be reduced and productivity can be improved as compared with the vacuum injection of injecting the liquid crystal material from the liquid crystal inlet in a vacuum state.

Figure 2:
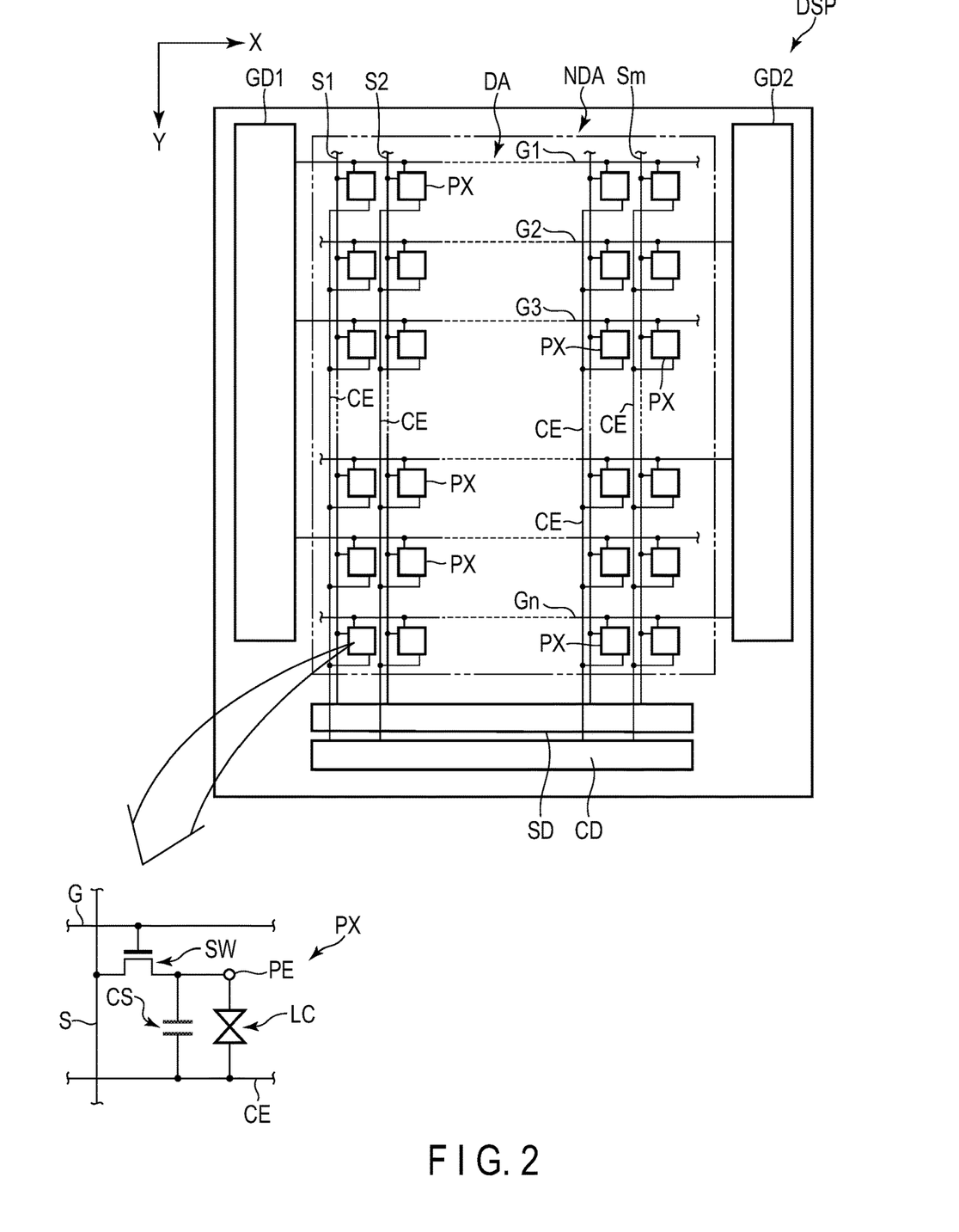
FIG. 2 is a diagram showing a configuration example of the display device DSP of the embodiments.

FIG. 2 is a diagram showing a configuration example of the display device DSP of the embodiment. The display device DSP comprises a plurality of scanning lines G (G1 to Gn), a plurality of signal lines S (S1 to Sm), common electrodes CE, and the like at the display portion DA. A plurality of scanning lines G extend in the first direction X and are spaced apart and arranged in the second direction Y. A plurality of signal lines S extend in the second direction Y and are spaced apart and arranged in the first direction X. The plurality of scanning lines G are drawn to the non-display portion NDA and are connected to scanning line drive circuits GD1 and GD2. The plurality of signal lines S are drawn to the non-display portion NDA and are connected to a signal line drive circuit SD. The common electrodes CE are arranged across the plurality of pixels PX and are connected to a common electrode drive circuit CD.

Each of the pixels PX comprises a switching element SW, a pixel electrode PE, a common electrode CE, a liquid crystal layer LC, and the like. The switching element SW is constituted by, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each of the pixel electrodes PE is opposed to the common electrode CE, and drives the liquid crystal layer LC by an electric field produced between the pixel electrode PE and the common electrode CE. A capacitor CS is formed between, for example, an electrode of the same electric potential as the common electrode CE and an electrode of the same electric potential as the pixel electrode PE.

Figure 3:
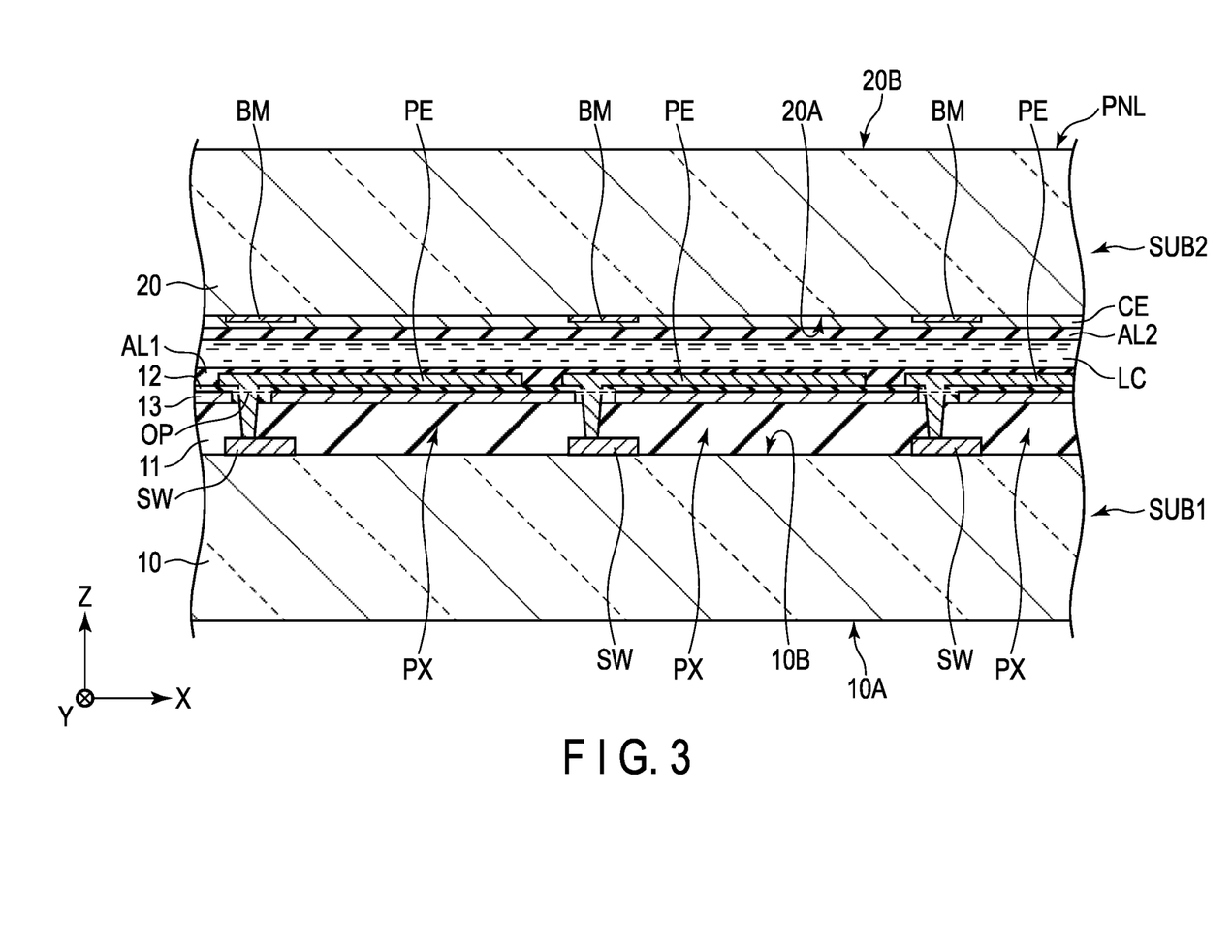
FIG. 3 is a cross-sectional view showing a configuration example of the display panel PNL shown in FIG. 1.

FIG. 3 is a cross-sectional view showing a configuration example of the display panel PNL shown in FIG. 1. The first substrate SUB1 comprises a transparent substrate 10, insulating films 11 and 12, a capacitive electrode 13, the switching elements SW, the pixel electrodes PE, and an alignment film AL1. The first substrate SUB1 further comprises the scanning line G and the signal line S shown in FIG. 2. The transparent substrate 10 comprises a main surface (lower surface) 10A and a main surface (upper surface) 10B on a side opposite to the main surface 10A. The switching elements SW are arranged on the main surface 10B. The insulating film 11 covers the switching elements SW. The capacitive electrode 13 is located between the insulating films 11 and 12. The pixel electrodes PE are arranged for the respective pixels PX on the insulating film 12. Each of the pixel electrodes PE is electrically connected to the switching element SW through opening OP of the capacitive electrode 13. The alignment film AL1 covers the pixel electrodes PE.

The second substrate SUB2 comprises a transparent substrate 20, light-shielding layers BM, the common electrode CE, and the alignment film AL2. The transparent substrate 20 comprises a main surface (lower surface) 20A and a main surface (upper surface) 20B on a side opposite to the main surface 20A. The main surface 20A of the transparent substrate 20 faces the main surface 10B of the transparent substrate 10. The light-shielding layers BM and the common electrode CE are arranged on the main surface 20A. For example, the light-shielding layers BM are located just above the switching elements SW and just above the scanning lines G and the signal lines S (not shown), respectively. The common electrode CE is arranged across the plurality of pixels PX and directly covers the light-shielding layers BM. The common electrode CE is electrically connected to the capacitive electrode 13 and has the same electric potential as the capacitive electrode 13. The alignment film AL2 covers the common electrode CE. The liquid crystal layer LC is located between the main surface 10B and the main surface 20A and is in contact with the alignment films AL1 and AL2. In the first substrate SUB1, the insulating films 11 and 12, the capacitive electrode 13, the switching elements SW, the pixel electrodes PE, and the alignment film AL1 are located between the main surface 10B and the liquid crystal layer LC. In the second substrate SUB2, the light-shielding layers BM, the common electrode CE, and the alignment film AL2 are located between the main surface 20A and the liquid crystal layer LC.

The pixel PX described with reference to FIG. 1 and FIG. 2 is provided between the transparent substrate 10 and the transparent substrate 20. The transparent substrates 10 and 20 are insulating substrates such as glass substrates or plastic substrates. The main surfaces 10A and 10B, and the main surfaces 20A and 20B are the surfaces substantially parallel to the X-Y plane. The insulating film 11 is formed of a transparent insulating material such as silicon oxide, silicon nitride, silicon oxynitride or acrylic resin. The insulating film 12 is an inorganic insulating film of silicon nitride or the like. The capacitive electrode 13, the pixel electrodes PE, and the common electrode CE are transparent electrodes formed of a transparent conductive material such as indium tin oxide (ITO) or indium zinc oxide (IZO). The light-shielding layers BM are, for example, conductive layers having resistance lower than the common electrode CE. For example, the light-shielding layers BM are formed of an untransparent metal material such as molybdenum, aluminum, tungsten, titanium, or silver. The alignment films AL1 and AL2 are horizontal alignment films having an alignment restriction force substantially parallel to the X-Y plane. For example, the alignment films AL1 and AL2 are subjected to alignment treatment in the first direction X. Incidentally, the alignment treatment may be a rubbing treatment or an optical alignment treatment.

Figure 4:
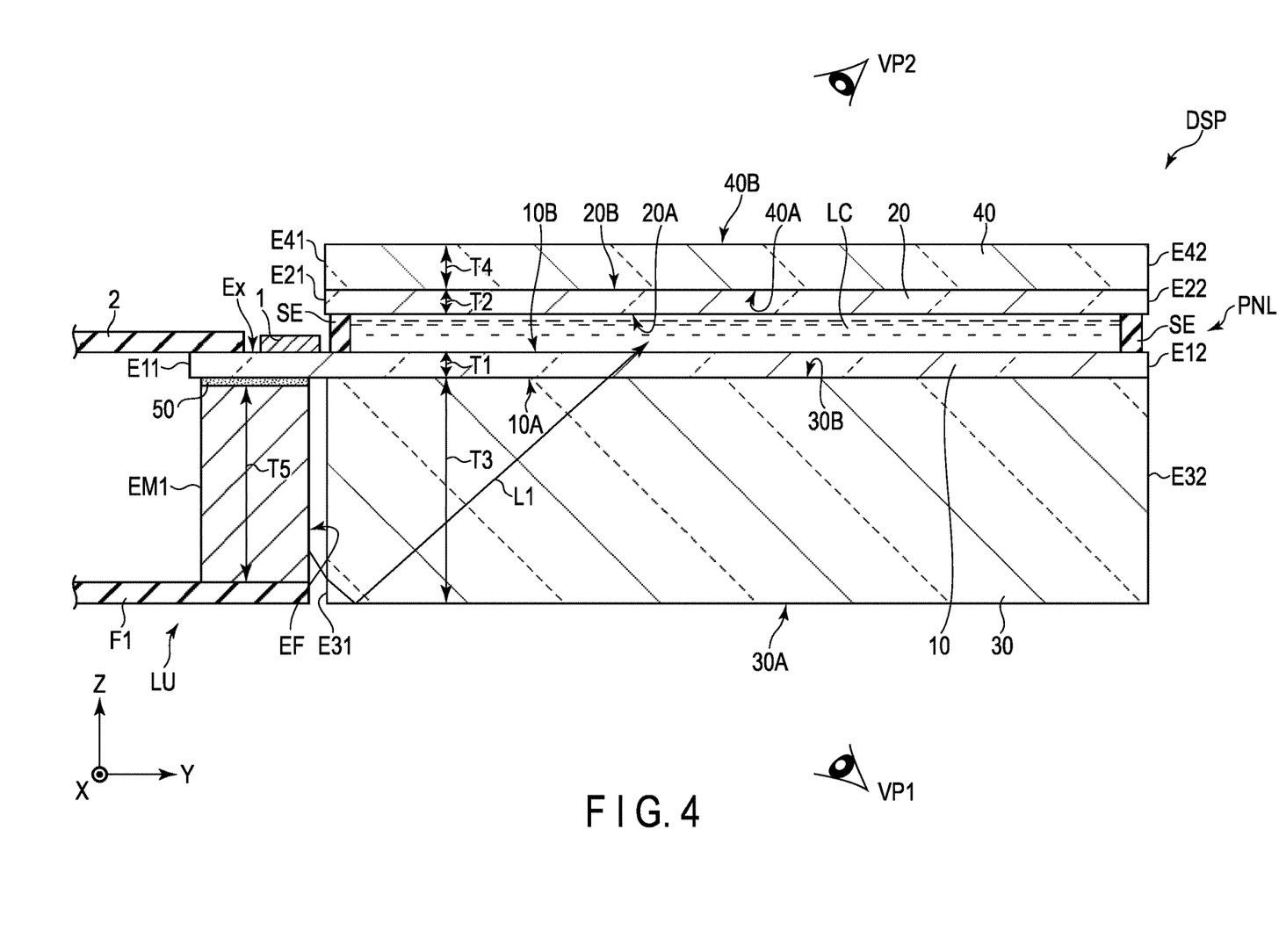
FIG. 4 is a cross-sectional view showing the display device DSP of the embodiments.

FIG. 4 is a cross-sectional view showing the display device DSP of the embodiment. The display device DSP further comprises transparent substrates 30 and 40, and a light source unit LU. The only parts necessary for descriptions on the display panel PNL will be simplified. The sealant SE is located between the main surface 10B and the main surface 20A. The liquid crystal layer LC is sealed between the main surface 10B and the main surface 20A by the sealant SE. The IC chip 1 and the wiring substrate 2 are located on the main surface 10B, at the extended portion Ex outside the sealant SE. The IC chip 1 is located between the wiring substrate 2 and the sealant SE.

The transparent substrates 30 and 40 are formed of, for example, transparent glass or transparent resin such as polymethyl methacrylate (PMMA) or polycarbonate (PC). The transparent substrate 30 comprises a main surface (lower surface) 30A, a main surface (upper surface) 30B on a side opposite to the main surface 30A, an end portion E31, and an end portion E32 located on a side opposite to the end portion E31. In the transparent substrate 30, the main surface 30B faces the main surface 10A and is bonded to the transparent substrate 10. The end portion E11 is located on the outer side than the end portion E31. In the example illustrated, the end portion 512 is located just above the end portion E32, but may be displaced with respect to the end portion 532. The transparent substrate 40 comprises a main surface (lower surface) 40A, a main surface (upper surface) 40B on a side opposite to the main surface 40A, an end portion E41, and an end portion E42 located on a side opposite to the end portion E41. In the transparent substrate 40, the main surface 40A faces the main surface 20B and is bonded to the transparent substrate 20. In the example illustrated, the end portion E41 is located just above the end portion E21, and the end portion E42 is located just above the end portion E22. However, the transparent substrate 40 may be displaced with respect to the transparent substrate 20.

A transparent adhesive layer which bonds the transparent substrates 10 and 30 has a refractive index equivalent to the transparent substrates 10 and 30. For this reason, optical conformity is made between the transparent substrate 10 and the transparent substrate 30, and undesired reflection and refraction are suppressed. Similarly, a transparent adhesive layer which bonds the transparent substrates 20 and 40 has a refractive index equivalent to the transparent substrates 20 and 40. Incidentally, illustration of the transparent adhesive layers are omitted. However, the transparent adhesive layers are located on the substantially entire surface between the main surfaces 10A and 30B and the substantially entire surface between the main surfaces 20B and 40A.

An optical film such as a polarizer or a retardation film is not present or an air layer is not present between the main surfaces 10A and 30B and between the main surfaces 20B and 40A. In addition, the main surfaces 30A and 40B are in contact with air, and are not covered with an optical film or are not covered with an untransparent member such as a casing. That is, as illustrated, the display device DSP can be observed from an observation position VP1 on the main surface 30A side and can also be observed from an observation position VP2 side on the main surface 40B.

The light source unit LU comprises a wiring substrate F1 and a light source EM1. The light source EM1 comprises, for example, a light-emitting diode (LED). Incidentally, the light source EM1 may comprise a light guide member between the light-emitting diode and the transparent substrate 30. The light source EM1 is electrically connected to the wiring substrate F1. The light source EM1 comprises a red light emitting part, a green light emitting part, and a blue light emitting part on the emission surface EF, though not described in detail. Incidentally, the emission surface EF may be an end surface close to the transparent substrate 30 of the light-emitting diode or an end surface close to the transparent substrate 30 of the light guide member. The light L1 emitted from the light source EM1 travels in a direction of an arrow indicative of the second direction Y.

Each of the light source EM1 and the wiring substrate F1 is located on the main surface 10A side. The light source EM1 is located between the transparent substrate 10 and the wiring substrate F1 and is opposed to the end portion E31. In the example illustrated, the light source EM1 is remote from the end portion E31 and an air layer is interposed between an emission surface EF and the end portion E31. The light source EM1 is bonded to the main surface 10A by an adhesive layer 50. The light source EM1 is overlaid on the IC chip 1 and the wiring substrate F1 through the transparent substrate 10. Incidentally, the wiring substrate F1 may be bonded to the main surface 10A.

The transparent substrate 10 has a thickness T1 between the main surfaces 10A and 10B. The transparent substrate 20 has a thickness T2 between the main surfaces 20A and 20B. The transparent substrate 30 has a thickness T3 between the main surfaces 30A and 30B. The transparent substrate 40 has a thickness T4 between the main surfaces 40A and 40B. In the present specification, the thickness corresponds to the length in the third direction Z.

The thickness T1 is substantially equal to the thickness T2. For example, each of the thicknesses T1 and T2 is approximately 0.13 mm. For this reason, bending of the display panel PNL can be suppressed after bonding the transparent substrate 10 and the transparent substrate 20.

The thickness T3 is larger than any one of the thickness T1 and the thickness T2. In addition, the thickness T3 is larger than the thickness T4. Furthermore, the thickness T3 is larger than a sum of the thickness T2 and the thickness T4. For example, the thickness T3 is approximately 1.6 mm and the thickness T4 is approximately 0.6 mm.

The light source EM1 has a thickness T5. The thickness T5 is smaller than or equal to the thickness T3. In addition, the entire surface of the emission surface EF faces the end portion E31. Thus, all of the light L1 emitted from the emission surface EF is substantially guided to the end portion E31.

The light L1 is refracted at the end portion E31 and made incident on the transparent substrate 30. The light traveling toward the main surface 30A, of the light L1 made incident on the transparent substrate 30, is reflected on an interface between the transparent substrate 30 and the air layer. The light L1 travels inside the transparent substrate 30 while being repeatedly reflected. Part of the traveling light L1 is made incident on the transparent substrate 10 from the main surface 10A and is made incident on the display panel PNL. The light L1 made incident on the display panel PNL is transmitted through the pixel in transparent state and scattered at the pixel in the scattered state. In addition, the display device DSP is so called a transparent display. A background of the display device DSP can be observed via the display device DSP when observed from the observation position VP1 or when observed from the observation position VP2.

In the example shown in FIG. 4, the transparent substrate 10 corresponds to a first transparent substrate, the transparent substrate 20 corresponds to a second transparent substrate, the transparent substrate 30 corresponds to a third transparent substrate, the transparent substrate 40 corresponds to a fourth transparent substrate, the IC chip 1 and the wiring substrate 2 correspond to signal sources, the light source EM1 corresponds to a first light source, the wiring substrate F1 corresponds to a wiring substrate, the main surface 10A corresponds to a first main surface, the main surface 10B corresponds to a second main surface, the main surface 20A corresponds to a third main surface, the main surface 20B corresponds to a fourth main surface, the main surface 30A corresponds to a fifth main surface, the main surface 40B corresponds to a sixth main surface, and the end portion E31 corresponds to a first end portion.

Figure 5:
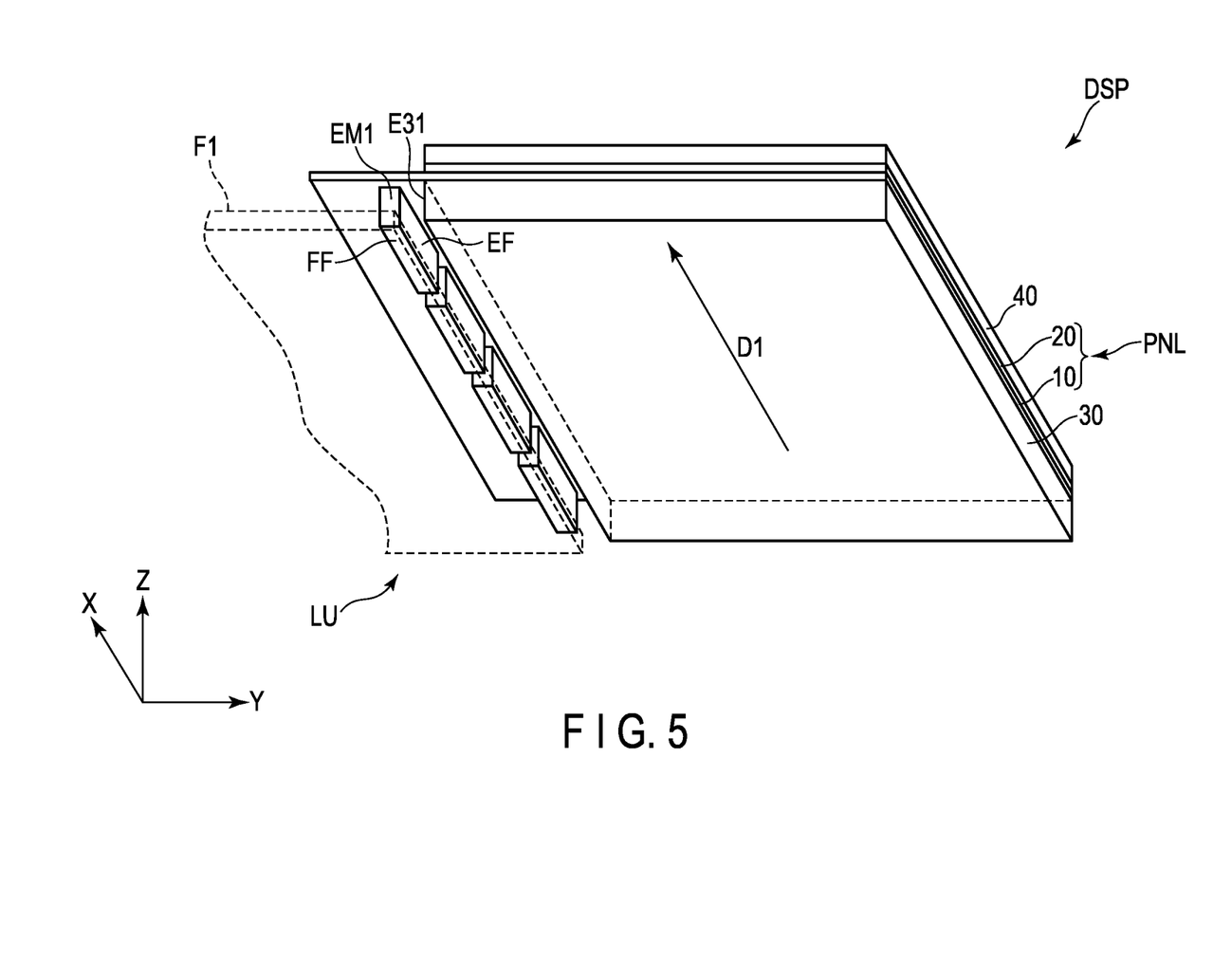
FIG. 5 is a perspective view showing the display device DSP of the embodiments.

FIG. 5 is a perspective view showing the display device DSP of the embodiment. A plurality of light sources EM1 are opposed to the end portion E31, and spaced apart with substantially the same intervals and arranged in the first direction X. In other words, the plurality of light sources EM1 are arranged in the direction of extension D1 of the polymers 31 shown in FIG. 1. The light source EM1 includes a mount surface FF mounted on the wiring substrate F1. In the example illustrated, the light source EM1 is a side-view type LED in which the emission surface EF and the mount surface FF are orthogonal to each other. Incidentally, the light source EM1 may be a top-view type LED in which the emission surface EF and the mount surface FF are opposed to each other. In addition, the light source EM1 may be a single light source in which the emission surface EF extends in the first direction X.

Next, the advantages of the embodiment will be described with a comparative example in FIG. 6.

Figure 6:
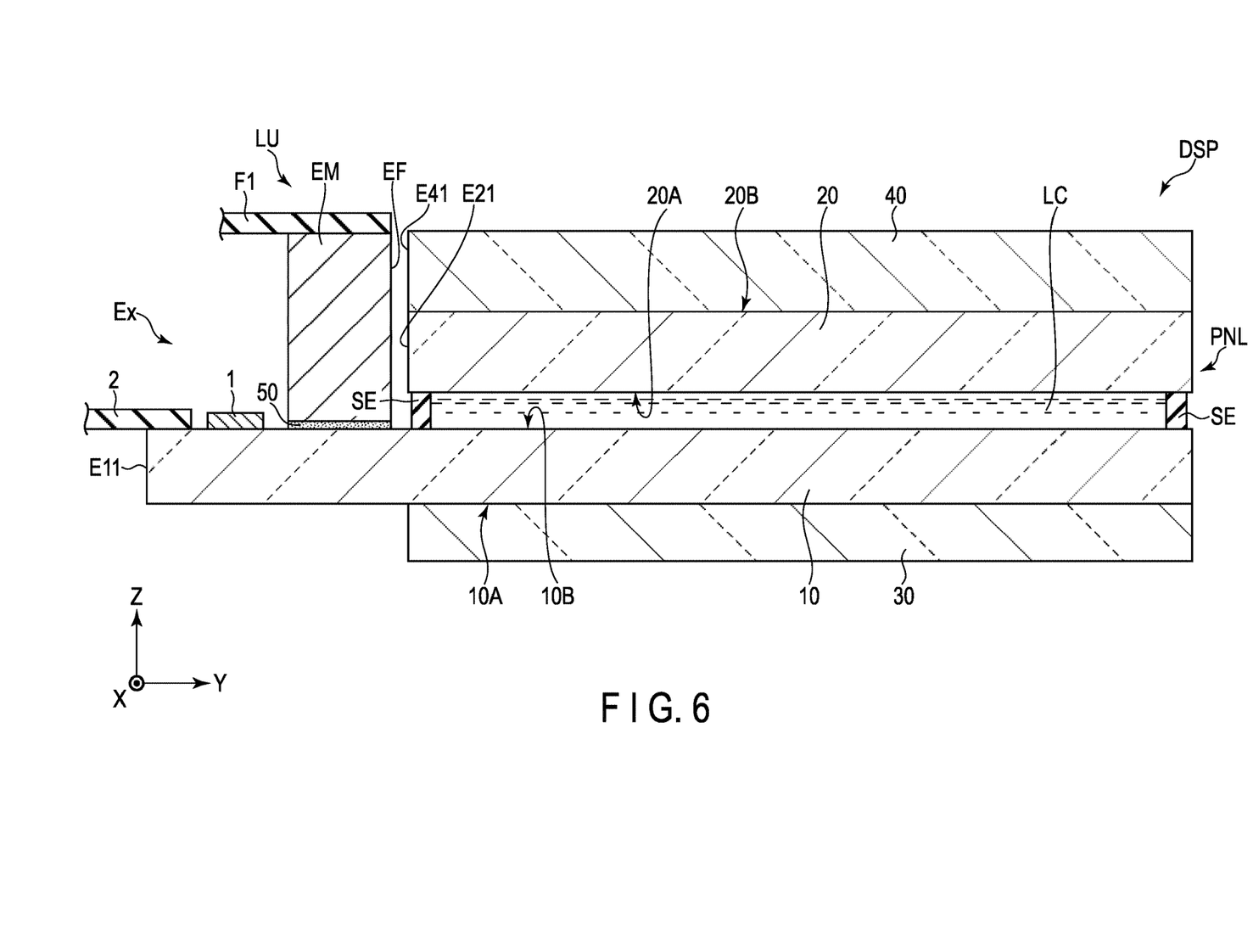
FIG. 6 is a cross-sectional view showing a comparative example of the display device DSP of the embodiments.

FIG. 6 is a cross-sectional view showing a comparative example of the display device DSP of the embodiment. The comparative example shown in the figure is different from the embodiment shown in FIG. 4 with respect to a feature that the light source EM is located on the main surface 10B side. The light source EM is bonded between the sealant SE and the IC chip 1 by the adhesive layer 50, at the extended portion Ex. The light source EM is opposed to each of the sealant SE, and the end portions E21 and E41. The light emitted from the emission surface EF is made incident on each of the sealant SE, the end portion E21 and the end portion E41.

If the light is made incident on the sealant SE, there is a risk that undesired scattering and absorption may occur at the sealant SE and the efficiency of use of the light may be degraded. In addition, there is a risk that the sealant SE can easily be visually recognized and degradation in display quality may be caused due to the scattering on the sealant SE. Furthermore, there is a risk that light having a certain wavelength, of the light emitted from the light source EM, may be absorbed on the sealant SE and desired color chromaticity cannot be thereby obtained. In particular, these problems are remarkable on the sealant SE having a low transparency. For this reason, the material having a high transparency needs to be selected for the sealant SE.

In contrast, in the embodiments of FIG. 4, the light sources EM1 are located on the main surface 10A side of the transparent substrate 10 and opposed to the end portion E31 of the transparent substrate 30 bonded to the main surface 10A. For this reason, the light emitted from the emission surface EF is hardly made incident on the sealant SE. The above problem resulting from the light incident on the sealant SE can be solved. In addition, the degree of freedom of the material to form the sealant SE is improved.

In addition, in the comparative example, the light emitted from the emission surface EF travels inside the transparent substrates 20 and 40. For example, when the end portions E21 and E41 are displaced due to displacement of the transparent substrate 20 and the transparent substrate 40, there is a risk that the efficiency of light incidence from the light source EM to the transparent substrates 20 and 40 may be degraded.

In contrast, in the embodiment of FIG. 4, the light emitted from the emission surface EF travels inside the single transparent substrate 30 which is not a bonded material unlike the comparative example. For this reason, accuracy in bonding of the transparent substrate 20 and the transparent substrate 40 is not required so much as that in the comparative example. Productivity can be therefore improved.

In addition, the light source EM1 is located on the main surface 10A side, and the IC chip 1 and the wiring substrate 2 are located on the main surface 10B side. For this reason, a region where the light source EM is provided is not required between the IC chip 1 and the sealant SE, unlike the comparative example. Therefore, the width of the extended portion Ex in the second direction Y (i.e., the length between the end portion E11 and the end portion E11 in the second direction Y) can be reduced and narrowing the frame of the display panel PNL can be implemented.

Next, a modified example of the embodiments will be described.

Figure 7:
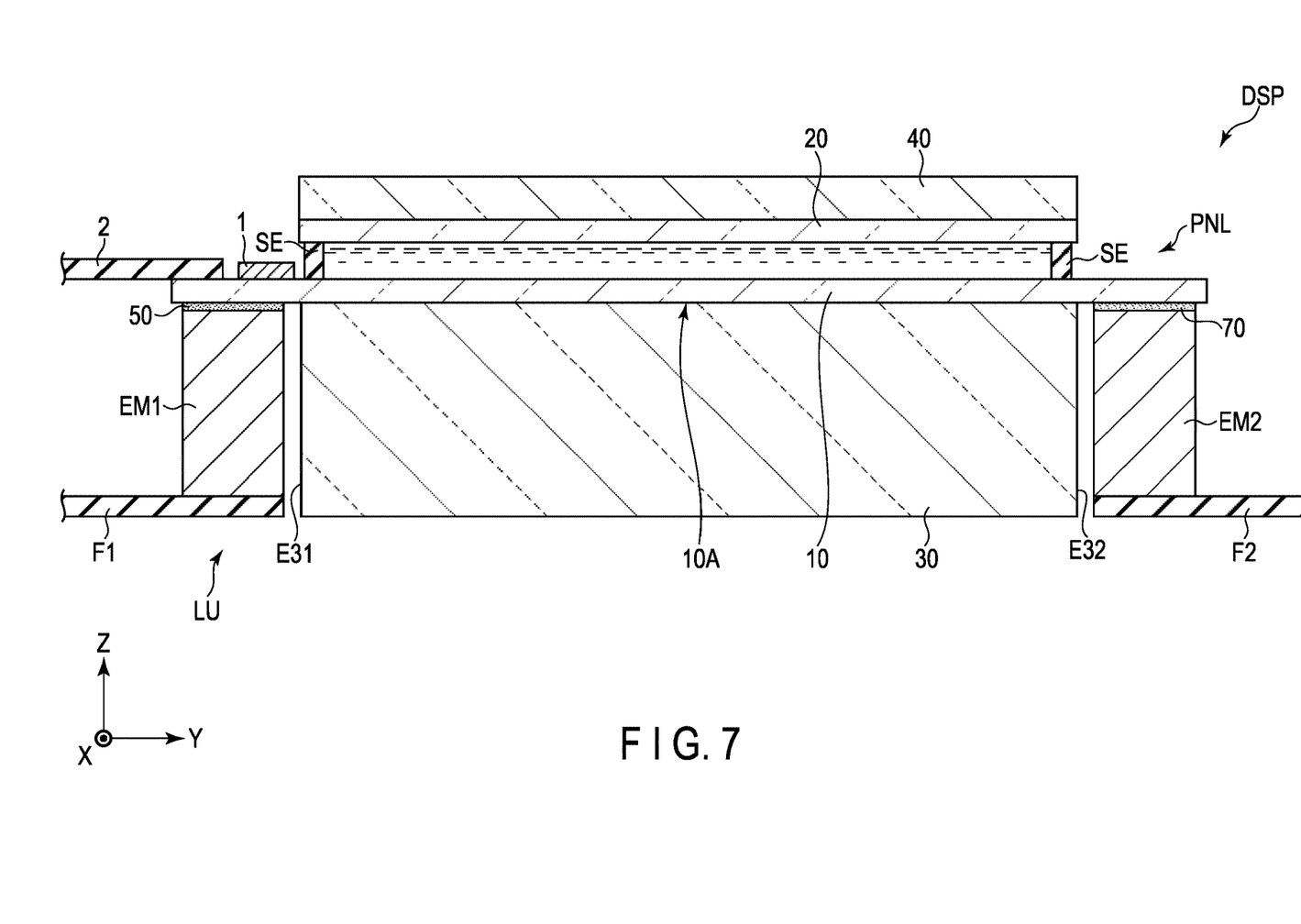
FIG. 7 is a cross-sectional view showing a modified example of the display device DSP of the embodiments.

FIG. 7 is a cross-sectional view showing a modified example of the display device DSP of the embodiment. The modified example shown in the figure is different from the configuration example shown in FIG. 4 with respect to a feature that the display device DSP further comprises a light source EM2. The light source EM2 is a light-emitting diode (LED) similar to the light source EM1. The light source EM2 is electrically connected to a wiring substrate F2. The light emitted from the light source EM2 travels in a direction opposite to an arrow indicative of the second direction Y.

The light source EM2 is located on the main surface 10A side and is opposed to the end portion E32. The light source EM2 is located between the wiring substrate F2 and the transparent substrate 10. The light source EM2 is bonded to the main surface 10A by an adhesive layer 70. The light source EM2 is separated from the end portion E32.

In this modified example, too, the same advantages as those described above can be obtained. In addition, since the light emitted from the light source EM2 is made incident from the end portion E32 of the transparent substrate 30, the quantity of light made incident on the display panel PNL is increased. Thus, even if the display panel PNL is made larger and the display portion DA is enlarged, degradation in luminance can be suppressed over the entire region of the display portion DA and the degradation in display quality can be suppressed.

In the example shown in FIG. 7, the light source EM2 corresponds to the second light source, the end portion E32 corresponds to the second end portion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
   a first transparent substrate including a first main surface and a second main surface located on a side opposite to the first main surface;
   a second transparent substrate including a third main surface opposed to the second main surface;
   pixels provided between the first transparent substrate and the second transparent substrate and arrayed in a matrix;
   a sealant located between the second main surface and the third main surface and surrounding the pixels arrayed in the matrix without a break;
   a polymer dispersed liquid crystal layer sealed between the second main surface and the third main surface by the sealant and containing polymer and liquid crystal molecules;
   a third transparent substrate including a first end portion and bonded to the first main surface;
   first light sources located on the first main surface side and opposed to the first end portion; and
   a fourth transparent substrate,
   wherein
   the third transparent substrate is thicker than any one of the first transparent substrate and the second transparent substrate,
   the second transparent substrate includes a fourth main surface located on a side opposite to the third main surface,
   the fourth transparent substrate is bonded to the fourth main surface,
   the third transparent substrate is thicker than the fourth transparent substrate, and
   the third transparent substrate is thicker than a sum of thickness of second transparent substrate and thickness of the fourth transparent substrate.

2. The display device of claim 1, further comprising:
   a switching element;
   a pixel electrode electrically connected to the switching element;
   a common electrode opposed to the pixel electrode; and
   a signal source,
   wherein
   the switching element and the pixel electrode are located between the second main surface and the polymer dispersed liquid crystal layer,
   the common electrode is located between the third main surface and the polymer dispersed liquid crystal layer,
   the signal source is located on the second main surface outside the sealant, and
   the first light sources are overlaid on the signal source through the first transparent substrate.

3. The display device of claim 1, wherein
   the polymer extends in a stripe shape, and
   the first light sources are arranged in a direction of the extension of the polymer.

4. The display device of claim 1, further comprising:
   a second light source,
   wherein
   the third transparent substrate includes a second end portion located on a side opposite to the first end portion, and
   the second light source is located on the first main surface side and is opposed to the second end portion.

5. The display device of claim 1, wherein
   the sealant is formed in a loop shape by ultraviolet curing resin.

6. The display device of claim 1, wherein
   a polarizer is not present between the first transparent substrate and the third transparent substrate or between the second transparent substrate and the fourth transparent substrate.

7. The display device of claim 6, wherein
   the third transparent substrate includes a fifth main surface on a side opposite to the first transparent substrate,
   the fourth transparent substrate includes a sixth main surface on a side opposite to the second transparent substrate, and
   the fifth main surface and the sixth main surface are in contact with air.

8. The display device of claim 7, further comprising:
   a switching element;
   a pixel electrode electrically connected to the switching element;
   a common electrode opposed to the pixel electrode; and
   a signal source,
   wherein
   the switching element and the pixel electrode are located between the second main surface and the polymer dispersed liquid crystal layer,
   the common electrode is located between the third main surface and the polymer dispersed liquid crystal layer,
   the signal source is located on the second main surface outside the sealant, and
   the first light sources are overlaid on the signal source through the first transparent substrate.

9. The display device of claim 8, wherein
the first light sources are bonded to the first main surface.

10. The display device of claim 9, further comprising:
a wiring substrate electrically connected to the first light sources,
wherein
the first light sources are located between the first transparent substrate and the wiring substrate.

11. The display device of claim 10, wherein
the polymer extends in a stripe shape, and
the first light sources are arranged in a direction of the extension of the polymer.

12. The display device of claim 11, further comprising:
a second light source,
wherein
the third transparent substrate includes a second end portion located on a side opposite to the first end portion, and
the second light source is located on the first main surface side and is opposed to the second end portion.

13. The display device of claim 12, wherein
the sealant is formed in a loop shape by ultraviolet curing resin.

* * * * *